Dec. 22, 1942.   H. MARTIN   2,305,790
VIBRATION DAMPING SUPPORT
Filed Feb. 10, 1941
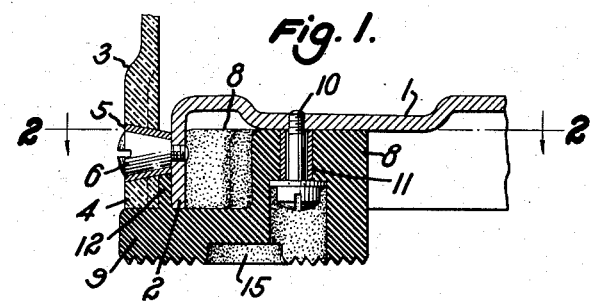
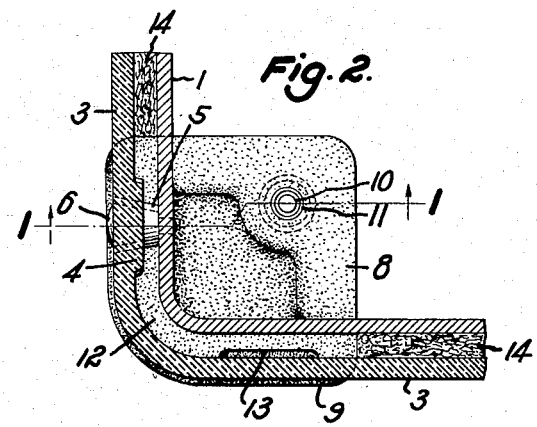
Inventor:
Hans Martin,
By Potter, Pierce & Scheffler,
Attorneys.

UNITED STATES PATENT OFFICE 2,305,790

VIBRATION DAMPING SUPPORT

Hans Martin, Erfurt, Germany; vested in the Alien Property Custodian

Application February 10, 1941, Serial No. 378,305
In Germany November 29, 1939

3 Claims. (Cl. 248—24)

This invention relates to vibration damping supports for small machines, particularly office machines, of the enclosed type in which the outer casing is secured to the metal supporting base of the machine but does not itself support any of the machine parts.

The casing muffles the noise of operation of the machine parts but both the casing and table top or other support for the machine have relatively large surfaces that may radiate sound waves of greater magnitude than those directly established by the machine parts. The casings of metal or molded plastics are of light weight, as they do not support any of the mechanism, and relatively small impressed forces may result in high amplitude vibrations of a part or all of the casing at frequencies of mechanical resonance of the casing. These resonance effects, when present, may convert the casing or the supporting surface into sound amplifiers that more than offset the noise-suppressing action of the casing.

An object of the present invention is to provide novel vibration damping supports, for small enclosed machines, in the form of bodies of resilient material with a main section to be positioned between the machine base and a supporting surface, and an extension that projects beyond the edge of the base to engage the casing and the supporting surface. Another object is to provide supports of the type stated for use with machines in which the casing is secured to but spaced from the machine base, the supports having resilient ribs that project upwardly to fit between the base and the casing. A further object is to provide supports for machines with flanged bases, the supports including a relatively thick main section with angularly arranged portions that terminate in surfaces for engagement with the flange of the base, and a section of lesser thickness that extends beyond the base flange to engage the casing.

These and other objects and advantages of the invention will be apparent from the following specification when taken with the accompanying drawing in which:

Fig. 1 is a fragmentary vertical section, taken on line 1—1 of Fig. 2, of a support embodying the invention, and the associated parts of a machine base and casing;

Fig. 2 is a fragmentary sectional view of the construction as seen from above the plane indicated by line 2—2 of Fig. 1.

In the drawing, the reference numeral 1 identifies the cast or pressed metal base of the machine, the base terminating along its edges in downwardly extending flanges 2. The casing 3 has the general form of an inverted box that is telescoped over the base and is of slightly larger dimensions than the base. When the casing is formed of a molded plastic material, the lower edges of side walls are reinforced at spaced points by inwardly projecting extensions 4 of the molded material, and conical openings extend through the reinforced sections to receive the rubber sleeves 5 and conical studs 6 that secure the casing to the base. The studs 6 have radial shoulders for engagement with the flange 2 when the studs are screwed into threaded openings in the flange, and the compression of the rubber sleeves is thereby limited to values that afford adequate support for the casing but that do not facilitate the transmission of mechanical vibrations from the base to the casing.

The construction so far described is typical of the machines with which the vibration damping supports are to be used. The supports are preferably attached to the base to serve as the feet of the machine but they may be separate from the machine and loosely seated in cups secured to the machine base or to the surface on which the machine is to be placed.

The support is formed of rubber or other elastic material and includes a relatively thick main section 8 with an upper surface of substantial area for engagement with the lower face of the metal base 1, and a section 9 of less thickness that extends beyond the base flange 2 to lie between the casing 3 and the supporting surface. A bore extends vertically through the main section 8 to receive the attaching stud 10, and a rigid sleeve 11 is inserted in the bore to limit the compression of the resilient material by the stud 10.

In the usual case of a rectangular machine base, the supports are arranged at the corners of the base and the main section 8 is of angular cross-section, as viewed in plan, with the projecting parts terminating in surfaces that engage the flanges 2 to prevent inadvertent movement of the support about the stud 10. A resilient rib 12 extends upwardly from the section 9 to fit snugly between the flanges 2 of the base and the casing walls. The upper edge of the rib 12 is beveled to facilitate the introduction of the rib into the gap, and depressions 13 are formed in the outer face of the rib to fit about the reinforcements 4 of the casing. Resilient inserts 14 of soft felt or the like extend between the ribs 12 of adjacent supports to close the gap between the machine base and the casings. The strips may be glued either to the casing or the base, but they do not form a connection between the parts and serve only to close the gaps.

The lower face of the support may be corrugated to preclude slipping upon a smooth surface and, as shown, it may be indented to form a central recess 15 beneath the inner portion of the extension 9.

The main section 8 of a support transmits the weight of the machine to a table top or other supporting surface and, being resilient, damps the vibration of the base and the transmission of vibrations to the supporting surface. The lateral extension 9 of the support does not carry any appreciable part of the weight of the machine but contacts both the casing and the supporting surface, and thereby damps any vibrations of these members that may be transmitted to them from the machine base.

The shape of the resilient supports may be varied in accordance with the shapes of the machine base and casing, and the dimensions will be determined by the weight to be carried. The illustrated embodiment is typical of the invention but various changes may be made without departing from the spirit of my invention as set forth in the following claims.

I claim:

1. A support of resilient material for machines having a metal base carrying the machine parts, and a casing secured to said base and cooperating therewith to form the housing of the machine; said support comprising a relatively thick main section for location between the machine base and a supporting surface, and a second section of less thickness extending from the main section to lie between and engage the casing and the supporting surface thereby to damp vibrations of said casing and to prevent transmission of sound vibrations between said casing and said supporting surface.

2. A support as claimed in claim 1, wherein a rib projects upwardly from the second section to lie between and engage the base and the casing.

3. A support as claimed in claim 1, wherein the main section has angularly disposed portions terminating in surfaces for engagement with a downwardly projecting flange of the machine base.

HANS MARTIN.